United States Patent

[11] 3,599,725

| [72] | Inventors | Arnold Gego<br>67, Soerser Weg, Aachen;<br>Heinrich Gugenhan, 53, Schulstrasse,<br>Duren, both of, Germany |
|---|---|---|
| [21] | Appl. No. | 834,821 |
| [22] | Filed | June 19, 1969 |
| [45] | Patented | Aug. 17, 1971<br>Continuation-in-part of application Ser. No.<br>549,033, May 10, 1966, now Patent No.<br>3,452,822. |

[54] ROW-TYPE AGRICULTURAL APPARATUS FOR THINNING, HOEING OR SPRAYING OF PLANTS
15 Claims, 20 Drawing Figs.

[52] U.S. Cl. ............................................... 172/6,
47/1.43, 200/25
[51] Int. Cl. ....................................... A01b 41/04,
H01h 1/00
[50] Field of Search .......................... 172/6, 519;
339/8; 200/25; 47/1.43

[56] References Cited
UNITED STATES PATENTS

| 1,763,272 | 6/1930 | Staege | 200/25 X |
| 2,507,001 | 5/1950 | Ferte | 172/6 |
| 2,601,464 | 6/1952 | Tanke | 172/519 X |
| 3,105,405 | 10/1963 | Bessonny | 200/25 X |
| 3,233,681 | 2/1966 | Ferte | 172/6 |
| 3,452,822 | 7/1969 | Gugenhan et al. | 172/6 |

FOREIGN PATENTS

| 1,250,669 | 9/1967 | Germany | 172/6 |

*Primary Examiner*—Robert E. Bagwill
*Attorney*—Mason, Fenwick & Lawrence

ABSTRACT: Control for a row cultivator having a selectively activatable cultivating tool for operation along specified portions of a row by activation of a rotary magnet with the magnet control including a rotary cylindrical control member driven through friction drive means by a ground-engaging means at a rate proportional to the speed of movement of the cultivator along the row with the control cylinder having conductive and nonconductive surfaces of varying length at different axial positions along the cylinder engageable with a contact for controlling the length of cultivation for a given revolution of the cylinder.

INVENTORS:
Arnold GEGO
Heinrich GUGENHAN

INVENTORS:
Arnold GEGO
Heinrich GUGENHAN

INVENTORS:
Arnold GEGO
Heinrich GUGENHAN

ROW-TYPE AGRICULTURAL APPARATUS FOR THINNING, HOEING OR SPRAYING OF PLANTS

BACKGROUND OF THE INVENTION

The invention relates to a control device for apparatus for thinning, hoeing or spraying plants standing in a row, comprising control elements which are arranged on a driven shaft and actuate the switching means for the working implements.

When thinning, hoeing or spraying plants standing in a row it is necessary alternately to work along a stretch in which the plants are thinned, hoed or sprayed (working stretch) and to move along a certain stretch containing at least one plant on which no work is to be carried out (protected zone). In order to ensure unhindered development of the plants remaining in the protected zone, the working stretches must have at least a certain length, namely the minimum working stretch. If, on the other hand, there is no plant behind the minimum working stretch, the working stretch must extend beyond the minimum working stretch up to some distance before the next following plant. The areas formed by the protected zones are blocks comprising a front part situated in front of the plants and a rear part behind these plants.

Various types of apparatus are known for thinning, hoeing or spraying plants in a row. For example, apparatus equipped with rotary, oscillating or rocking hoeing tools are used for thinning and hoeing plants in a row, and apparatus equipped with a spray device are used for spraying plants arranged in a row. For working along the working stretch but not along the protected zone it is necessary to have a control device for the implements provided on the apparatus for thinning, hoeing, or spraying.

A control device for apparatus for thinning, hoeing or spraying plants standing in a row comprising control members which are arranged on a driven shaft and which actuate the switching means for the working implements is already known. The control members of this control device are cam plates which are arranged to be replaceable on their drive shaft. These cam plates, however, can only effect control over specific lengths of the protected zones and working stretches. If it is desired to use the apparatus for protected zones and working stretches of different lengths, the cam plates used in the known control device have to be exchanged, which is a great disadvantage.

According to another proposal a control device of the type in question is provided in which the control members are pairs of cam plates. The two cam plates forming a pair in each case are arranged to be rotatable relatively to each other so that it is possible to vary the length of the working stretch and of the protected zone when working with the apparatus. However, these cam plates render the control device very complicated, subject to disturbances and expensive.

It is the object of the invention to provide a new and improved control device which is an improvement over previously known control devices. In particular, the invention aims to provide a control which can be adjusted in a simple manner to enable working with different lengths of working stretches and protected zones. Furthermore, the control device is to have a very wide range of adjustment. In addition, it should be possible by means of the invention to vary the beginning of the protected zone in relation to the plants situated in the zone. Furthermore, it should be readily adaptable to apparatus designed to work on several rows. Lastly, it should be simple, trouble-free in operation, versatile and inexpensive.

SUMMARY OF THE INVENTION

To solve this problem the invention provides in a row-type agricultural apparatus for thinning, hoeing or spraying of plants having working implements selectively operable for working on discrete portions of a working stretch of at least one row of plants and having means for selectively deactivating the implements to create a protected nonworked stretch of this row of plants, the improvement comprising a control means including a rotary control roller formed with first and second circumferential control portions overlapping in the axial direction and corresponding to the protected stretch and the minimum working stretch. Drive means are provided for rotating the control roller and axially adjustable means support a switch means close to the circumference of said control roller. The switch is operable when adjacent said first portion through a control circuit to deactivate said working implements but is operable through said control circuit when adjacent said second portion for activating said working implements.

Another feature of the invention is that the ratio of arcuate lengths of the circumferential arcs of the two control portions varies in accordance with the axial distance from the ends of the control roller. In conjunction with the axially adjustable arrangement of the switch means, this design of the control roller makes it possible to alter the ratio of length of the protected stretch to the length of the working stretch.

According to the invention the new apparatus further includes a stop device for each control roller, which stop device holds the control roller in an angular position at which a switching effect keeping the working implements in the operative position is exerted by the switching means, and deactivating means operable in response to the detection of a plant for deactivating said stop device to release the control roller so that the working implements are subsequently deactivated.

By means of this stop device, the working process is continued beyond the minimum working stretch if there is no plant immediately behind the minimum working stretch, and the work is stopped only at some distance before the next following plant.

Moreover the invention provides various advantageous embodiments for the construction of the control rollers and of the switching means cooperating therewith. In all these embodiments the switching means act on the working implements either directly or via some further switching elements and they keep the implements in their operative position in the region of the working stretch and in the position of rest in the region of the protected zone.

According to the invention, each control roller is driven by way of a slip coupling. The individual control rollers can easily be stopped by means of these slip couplings. Moreover, by virtue of the slip couplings, the control rollers can be driven independently of each other.

Furthermore, the invention provides that each control roller is arranged on a shaft which is driven by means of a belt drive with a stepped pulley and a friction coupling from a wheel including an uninflated tire rolling over the ground. The uninflated tire is provided with apertures to insure that the air within its interior is not under pressure.

By using the ground wheel for the drive of the control rollers the control means is made to function in dependence upon the path over which the apparatus moves. The provision of the ground wheel with a tire cover the interior of which is filled by air being not under pressure (uninflated) causes the tire to flex as it runs along the ground, thus avoiding the adhering of lumps to the tire cover and in consequence thereof a slipping of the ground wheel.

On the other hand, the use of a stepped pulley in the belt drive of the control rollers makes it possible to vary the total stretch composed of protected zone and minimum working stretch or the minimum distance between the starting points of the protected zones.

The invention also provides means for stopping the control rollers in that each control roller includes a stop surface on its periphery, a pivoted lever member is mounted adjacent the periphery of said roller and has a free end portion normally spring biased into holding engagement with said stop surface to hold said control roller against rotation. An electromagnet is associated with the stop lever member for withdrawing the same from holding engagement with the associated stop surface upon actuation of the electromagnet.

Means for actuating each stop electromagnet is provided in the form of an electric feeler member positioned a selected distance in advance of the working implements along the direction of travel of the apparatus and control circuit means for said electromagnet intercoupled with said feeler member and said electromagnet for energizing the electromagnet upon contact of the feeler member with the plants.

BRIEF DESCRIPTION OF THE DRAWINGS

The accompanying drawings show constructional examples illustrating the invention diagrammatically.

DESCRIPTION OF THE PREFERRED EMBODIMENTS

Figure 1:
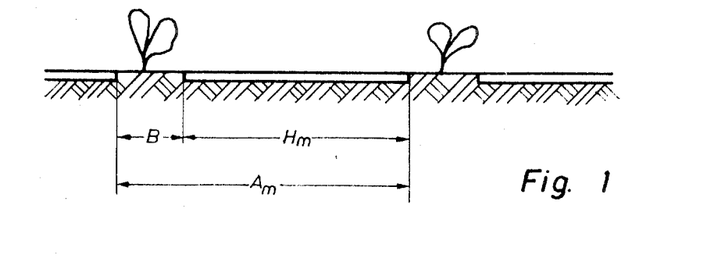
FIG. 1 shows a row of plants to be treated.
Figure 2:
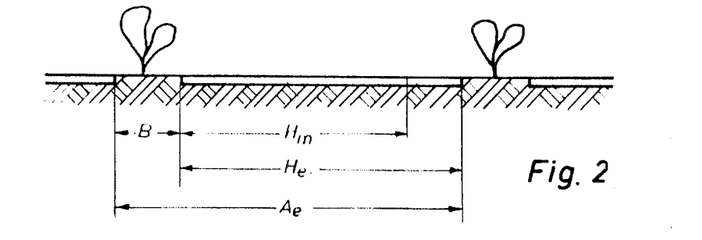
FIG. 2 shows another row of plants to be treated.

FIGS. 1 and 2 illustrate the situation in plant rows when the plants standing in a row are to be thinned such that plants are preserved only at a minimum distances apart and the other plants are removed. In these FIGS. B indicates the protected zone or length of block in which the plants are left to stand and no work is carried out. $H_m$ indicates the minimum working stretch along which any plants present are removed. The protected zone B and the minimum working stretch $H_m$ together form the minimum block distance $A_m$. If there is no plant immediately behind the minimum working stretch $A_m$, the work is continued up to some distance before the next plant is reached. This may result in an effective working stretch $H_e$ and consequently an effective block distance $A_e$.

The apparatus illustrated in this application is limited for the sake of clarity to means for working on a single row of plants. However, apparatus and control means for simultaneously working on several plant rows is feasible by merely pluralizing the parts.

Figure 3:
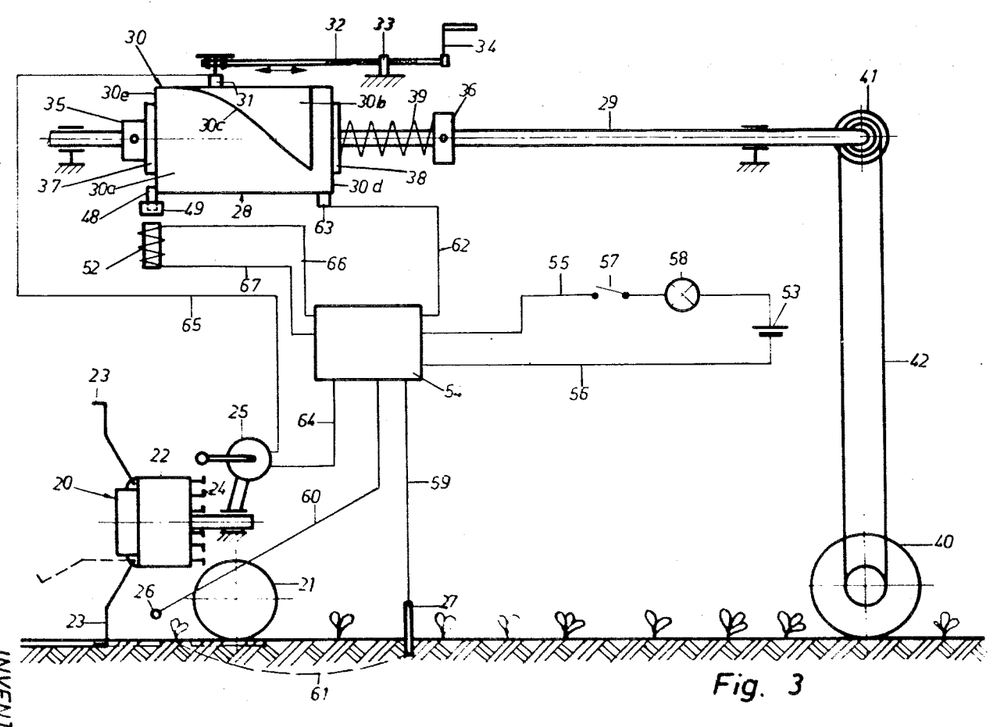
FIG. 3 shows an apparatus for thinning plants standing in a row and, on an enlarged scale, control means for the same.

The apparatus 20 for thinning the plant row is conventional and is of the type illustrated in U.S. Pat. No. 3,361,217 of applicants. The apparatus 20 runs over the ground by means of wheels 21 and has a rotary tool disc 22. Hoeing tools 23 are arranged concentrically and in stellate formation on this tool disc 22. The hoeing tools 23 can execute swinging movements perpendicularly to the plane of rotation of the tool disc 22 between end positions situated radially and parallel to the axis of rotation of the tool disc 22. The operative position of the hoeing tools 23 is shown in full lines and their inoperative position in dotted lines. Pawls 24 are provided for swinging the hoeing tools 23 from their operative into their inoperative position and the return movement into the operative position is effected by springs (not to be seen) situated inside the tool disc 22. A rotary magnet 25 is provided for actuating the locking pawls 24. This magnet 25 is set into operation by the control means.

The thinning apparatus 20 is provided in addition with an electric feeler 26 which is situated at some distance above the ground and comes into engagement with the plants of the row of plants that is to be thinned. In addition, the thinning apparatus 20 is provided with a slide shoe 27 which acts as earth contact.

Figure 5:
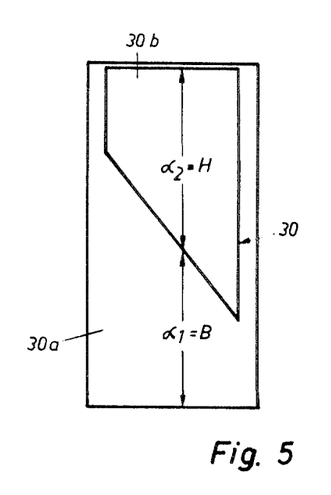
FIG. 5 shows the development of the circumferential surface of the control roller of FIG. 3.

The control means comprises a control roller 28 being arranged on a drive shaft 29. The control roller 28 consists of dielectric material. Its circumferential surface 30 is subdivided into two circumferential control portions 30a and 30b. These two control portions 30a, 30b are limited with regard to each other by a partly curved line 30c. A development of the circumferential surface 30 of the control roller 28 is shown in FIG. 5.

The control portion 30a of the control roller 28 is covered with a metal layer (not shown) and is therefore electrically conductive. As shown in FIG. 5, which represents a rolled out development of the cylindrical surface of the roller 28, its length of arc $\alpha 1$ corresponds to the protected zones B of the plant rows to be treated. The control portion 30b is not electrically conductive. Its length of arc $\alpha 2$ corresponds to the minimum working stretches $H_m$ of the plant rows that are to be treated.

Adjacent the circumferential surface 30 of the control roller 28 is arranged a sliding contact 31 which is in engagement with the circumference of the control roller 28. This sliding contact 31 is arranged at the free end of a spindle 32 being supported by a spindle bearing 33 and being provided at its other end with a handle 34. By means of the spindle 32 the sliding contact 31 is axially adjustable with regard to the control roller 28.

When the control roller 28 rotates its control portions 30a and 30b move along the sliding contact 31. The magnitudes of the lengths of arc $\alpha 1$ and $\alpha 2$ of the control portions 30a and 30b which pass along the sliding contact 31 during the rotation of the control roller 28 depends upon the axial distances of the sliding contact 31 from the end surfaces 30d and 30e of the control roller 28.

The control roller 28 is arranged on the drive shaft 29 freely rotatable between two rings 35, 36 being fixed to the drive shaft 29 and to washers 37, 38 interposed between the rings 35, 36 and the control roller 28. Besides thereof there is a helical pressure spring 39 arranged between the ring 36 and the washer 38. This arrangement results in a frictional slip coupling of the drive of the control roller 28 by the drive shaft 29.

For driving the drive shaft 29 there is provided a ground engaging wheel 40 which is connected to the thinning apparatus 20 and acts by means of a drive belt 42 on a stepped pulley 41 arranged on the drive shaft 29.

Figure 19:
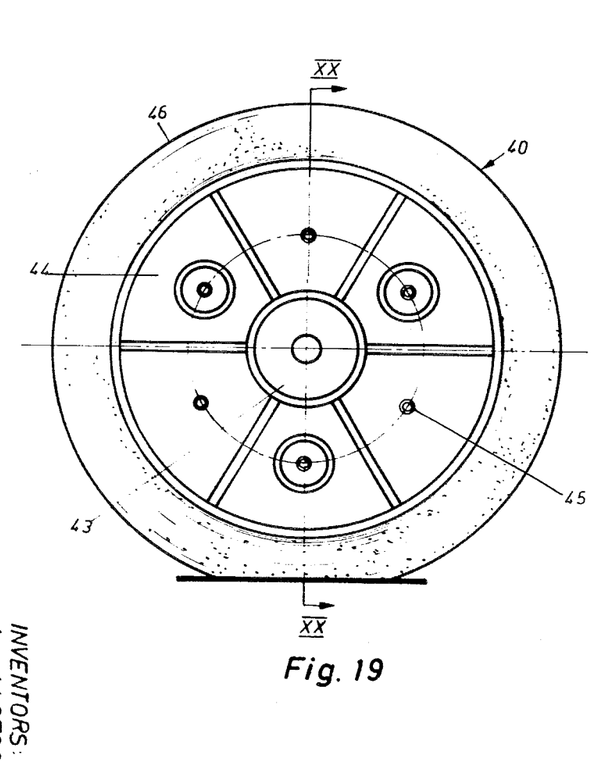
FIG. 19 shows a side view of the ground wheel of the apparatus.
Figure 20:
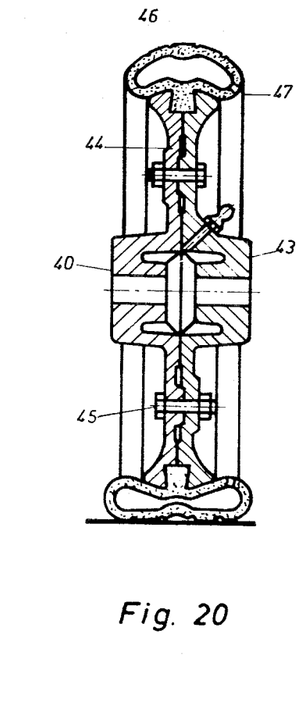
FIG. 20 shows a section of the ground wheel taken along line XX-XX of FIG. 19.

The ground-engaging wheel 40 comprises a hub 43 and a rim 44 which are composed of two halves being connected by screws 45. Additionally, the ground wheel 42 has a tire 46 on its periphery. This tire 46 is filled with air but is not under pressure. To allow the entrance of air into the tire 46 and the exit of air from the same the tire 46 is provided at one of its sides with apertures 47. This enables the tire 46 to be compressed and flexed when it runs over the ground. Consequently, the adhering of lumps to the tire 46 and consequent slipping of the ground wheel 40 are avoided. The drive transmitted from the ground wheel 40 to the shaft 29 and the control roller 28 is therefore always an accurate reflection of the contour of the path on the ground. The transmission ratio of the drive from the ground wheel 40 to the shaft 29 can be varied by means of the stepped pulley 41.

Figure 4:
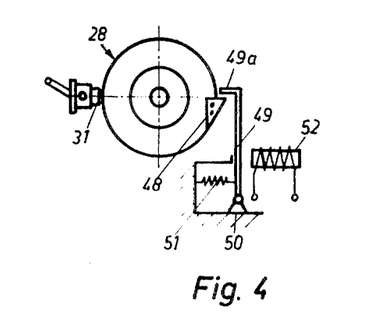
FIG. 4 shows an end view of the control means of FIG. 3.

The control roller 28 is provided at its end surface 30e with a stop 48 projecting radially beyond its circumferential surface 30. For cooperating with the stop 48 there is provided a pivoted lever 49 having a free end portion 49a which is movable into holding engagement with the stop 48. The lever 49 is swingably mounted on a support 50 and is controlled by the action of a tension spring 51 and an electromagnet 52. The tension spring 51 has the tendency to hold the lever 49 with its end portion 49a normally in holding engagement with the stop 48 of the control roller 28. On the other hand, the electromagnet 52, when energized, pulls the lever 49 with its end portion 49a out of engagement with the stop 48 of the control roller 28.

When the electromagnet 52 is not energized and the tension spring 51 urges the lever 49 towards the control roller 28, the stop 48 of the control roller 28 comes into engagement with the end portion 49a of the lever 49 when the control roller 28 rotates. Consequently, rotation of the control roller 28 is stopped. The control roller 28 is driven by means of a slip coupling and can consequently be stopped while the coupling slips. Rotation of the control roller 28 can only continue when the electromagnet 52 is energized and pulls the lever 49 towards itself to release the stop 48.

The source of current of the control means is a 12-volt battery 53. This is connected to a switch box 54 by leads 55 and 56. A main switch 57 and a control lamp 58 are also connected into the lead 55.

Another lead 59 extends from the switch box 54 to the slide shoe 27. The electric feeler 26 is connected to the switch box 54 by a lead 60. When the feeler 26 comes into contact with a plant, the circuit between the feeler 26 and the slide shoe 27 is closed through the earth, as indicated by the broken line 61 in FIG. 2.

Another lead 62 leads from the switch box 54 to a sliding contact 63 being in engagement with the circumferential surface 30 of the control roller 28 adjacent its end surface 30d. Thereby an electrical connection between the switch box 54 and the electrically conductive control portion 30a of the control roller 28 is established. Furthermore, a lead 64 leads from the switch box 54 to the rotary magnet 25 of the thinning apparatus 20. A lead 65 is connected to the rotary magnet 25 at one end and to the sliding contact 31 at the other end. When an electrical connection is established between the lead 62 and the lead 65 by engagement of the sliding contact 31 with the control portion 30a of the control roller 28, the rotary magnet 25 is actuated and the hoeing tools 23 are thereby moved into their inoperative position.

Lastly, the electromagnet 52 is connected to the switch box 54 by leads 66 and 67.

Figure 18:
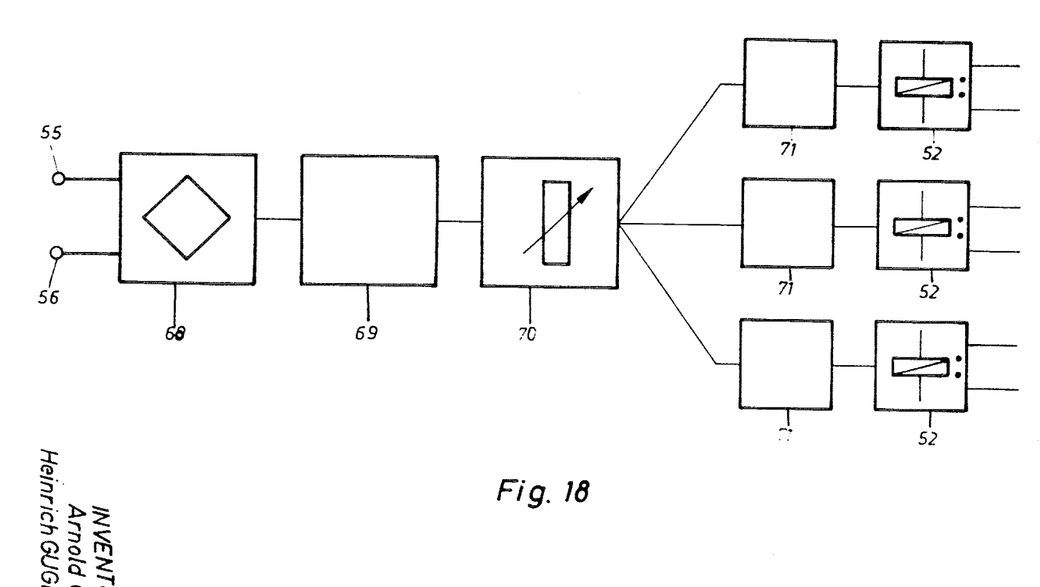
FIG. 18 shows a block circuit diagram of different switching elements of the control means.

As shown in FIG. 18 the switch box 54 contains a diode arrangement 68, a voltage converter 69, a potentiometer 70, and one or more current amplifier impedance converters 71 to each of which is connected an electromagnet 52. Therein the construction and switching of these circuit elements is as illustrated in the application Ser. No. 549,033 of applicants.

When contact is made by the feeler 26 with a plant, the current then flowing through the feeler circuit is amplified by the electrical means arranged in the switch box 54. Moreover, in this case, a current flows through the leads 66, 67 connected to the electromagnet 52, and as result thereof the electromagnet 52 is energized and pulls up the lever 49.

Provided that the control roller 28 was stopped by engagement of its stop 48 with the end portion 49a of the lever 49, as illustrated in FIGS. 3 and 4, the control roller 28 is released by the movement of the lever 49. This enables the control roller 28 to continue its rotation. The sliding contact 31, which is at this time approximately in the middle of the control portion 30b corresponding to the minimum working stretch, at first, remains in engagement with this portion of the control roller 28 as the rotation of the control roller continues. Consequently, the hoeing tools 23 of the thinning apparatus 20 also at first remain in their operative position, however, as the rotation of the control roller 28 continues, its control portion 30a corresponding to the protected zone reaches the sliding contact 31, and the rotary magnet 25 is energized by the current which then flows and it swings the hoeing tools 23 from their operative into their inoperative position.

This operative state continues until the control portion 30a of the control roller 28 has passed the sliding contact 31. As soon as the control portion 30b of the control roller 28 again engages with the sliding contact 31, the supply of current to the rotary magnet 25 is cut off and consequently the hoeing tools 23 swing back from their inoperative position into their operative position.

In the course of the rotation of the control roller 28 which now follows, the stop 48 of the control roller 28 again comes into engagement with the end portion 49a of the lever 49, so that the control roller 28 is again stopped unless the feeler 26 has made a contact with a plant at the end of the minimum working stretch, in which case the lever 49 may again be pulled up by the electromagnet 52 and there is then nothing to stand in the way of further rotation of the control roller 28. If, on the other hand, the feeler 26 has not made contact with any plant at the end of the minimum working stretch, the control roller 28 is again stopped until the feeler 26 makes contact with a plant standing beyond the minimum working stretch.

When the control roller 28 is again stopped, the sliding contact 31 remains in engagement with the control portion 30b and the hoeing tools 23 therefore also maintain their operative position. As soon as thereafter as a further plant is contacted by the feeler 26, the control process described is repeated.

In FIGS. 6 to 17 a number of other embodiments of the control roller and of the switching means cooperating therewith are illustrated.

Figure 6:
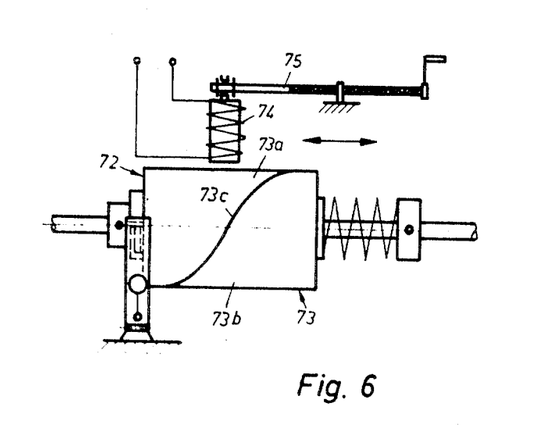
FIG. 6 shows a side view of another control roller and of an electromagnetic induction coil cooperating therewith.
Figure 7:
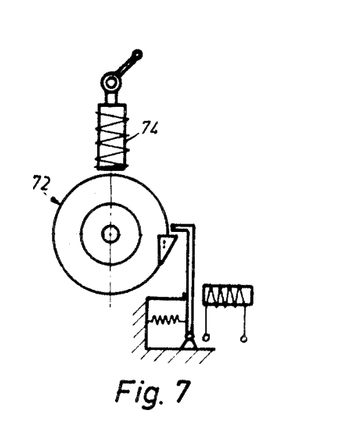
FIG. 7 shows an end view of the control roller and coil means of FIG. 6.

The embodiment shown in FIGS. 6 and 7 comprises a control roller 72 the circumferential surface 73 of which has control portions 73a and 73b being limited with regard to each other by a curved line 73c. The control roller 72 consists of dielectric material. Its control portion 73a corresponds to the protected zones and is covered with a metal layer (not shown), while its control portion 73b corresponds to the minimum working stretches and is not provided with a metal layer. In this embodiment the switching means includes an electromagnetic induction coil 74 arranged closely adjacent the circumferential surface 73 of the control roller 72. The induction coil 74 is axially adjustable with regard to the control roller 72 by means of a spindle 75. The magnitude of the current flowing through the induction coil 74 depends thereon whether the control portion 73a or the control portion 73b of the control roller 72 is adjacent the induction coil 74. This effect is used for bringing the working tools 23 in their operative position or out of their operative position by means of the rotary magnet 25.

Figure 8:
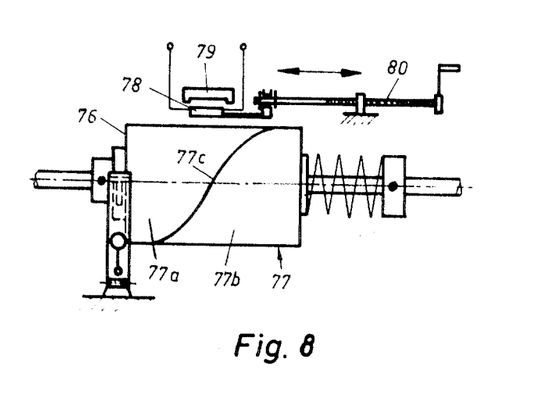
FIG. 8 shows a side view of another control roller and of a contactless terminal switch cooperating therewith.
Figure 9:
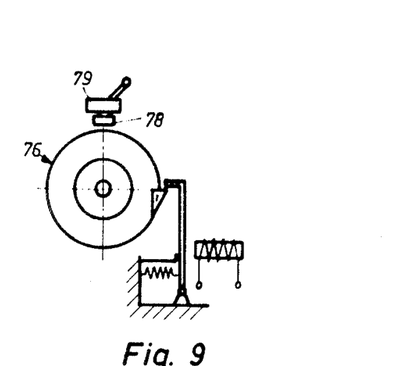
FIG. 9 shows an end view of the control roller and switching means of FIG. 8.

The embodiment of FIGS. 8 and 9 comprises a control roller 76 the circumferential surface 77 of which has control portions 77a and 77b being limited with regard to each other by a curved line 77c. The control roller 76 consists of dielectric material. Its control portion 77a corresponds to the protected zones and is covered with a metal layer (not shown), while its control portion 77b corresponds to the minimum working stretches and is not provided with a metal layer. In this embodiment the switching means includes a terminal switch 78 arranged closely adjacent the circumferential surface 77 of the control roller 76 and comprising a not shown reed contact. On the side of the terminal switch 78 opposite to the control roller 76 is arranged a permanent magnet 79. The terminal switch 78 and the permanent magnet 79 are axially adjustable with regard to the control roller 76 by means of a spindle 80. When the control portion 77a of the control roller 76 is adjacent the switch 78 and its magnet 79 the switch 78 is closed by the action of the magnet in cooperation with the metal layer of this control portion, which in turn causes a deactivation of the hoeing tools 23 by means of the rotary magnet 25. On the other hand the switch 78 opens when the control portion 77b of the control roller 76 comes into the region of the same, as the magnet 79 along is unable to hold the switch 78 in its closed position. In consequence thereof the hoeing tools 23 resume their operative position.

Figure 10:
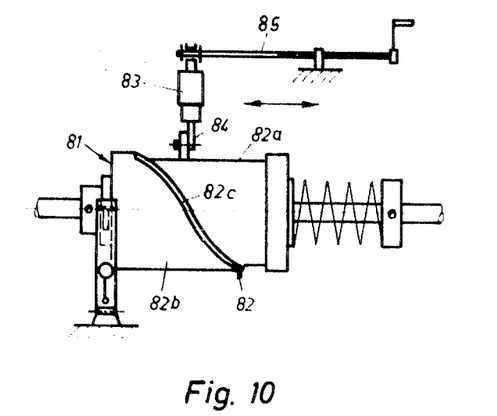
FIG. 10 shows a side view of another control roller and of a microcontact cooperating therewith.
Figure 11:
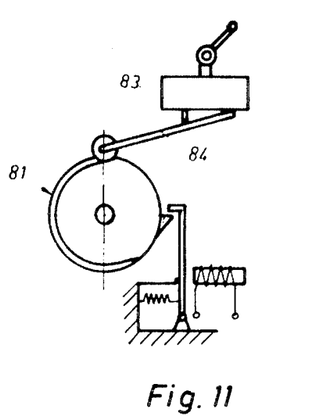
FIG. 11 shows an end view of the control roller and switching means of FIG. 10.

The embodiment shown in FIGS. 10 and 11 comprises a control roller 81 the circumferential surface 82 of which is in the form of a relief. It has a depressed control portion 82a corresponding to the protected zones and an elevated control portion 82b corresponding to the minimum working stretches, which portions 82a and 82b are limited with regard to each other by an inclined shoulder 82c. The switching means of this embodiment includes a microcontact 83 which has a roller lever 84 engaging the relief surface 82 of the control roller 81. The microcontact 83 is axially adjustable with regard to the control roller 81 by means of a spindle 85. The microcontact 83 is wired up in such a manner that it closes a circuit when its roller lever 84 is in the region of the control portion 82a which results therein that the hoeing tools 23 are deactivated by means of the rotary magnet 25, and that it opens this circuit when its roller lever 84 is in the region of the control portion 82b whereby the hoeing tools 23 resume their operative position.

Figure 12:
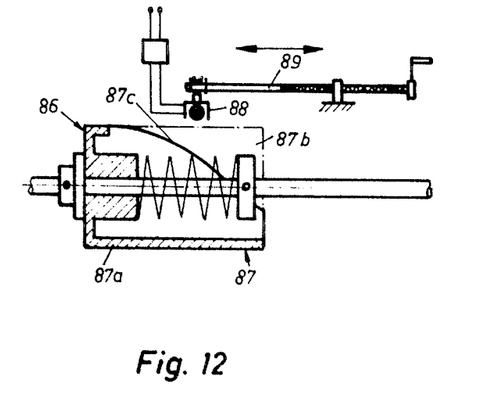
FIG. 12 shows, partly in side view and partly in section, a further control roller and a reflex switch cooperating therewith.
Figure 13:
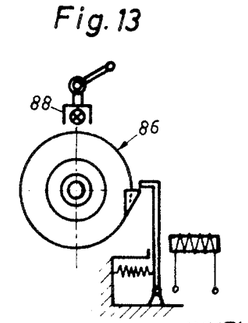
FIG. 13 shows an end view of the control roller and switching means of FIG. 12.

The embodiment of FIGS. 12 and 13 comprises a control roller 86 being provided with a hollow cylindrical shell 87. This hollow cylindrical shell 87 has a cutout part 87b representing a first control portion corresponding to the minimum working stretches and a remaining part 87a forming a second control portion corresponding to the protected zones, wherein the two control portions 87a and 87b are limited with regard to each other by the curved edge 87c of the part 87a. The switching means of this embodiment includes a reflex switch 88 arranged closely adjacent the shell 87 of the control roller 86 and being of the type shown in the U.S. Pat. No. 2,864,292. The reflex switch 88 is axially adjustable with regard to the control roller 86 by means of a spindle 89. The reflex switch 88 comprises a source of light the rays of which are directed towards the shell 87 of the control roller 86. When the control portion 87a of the control roller 86 is adjacent the reflex switch 88 the rays of the source of light of the reflex switch 88 are reflected back to the same. This causes the closing of a circuit which in turn brings the hoeing tools 23 by means of the rotary magnet 25 into their inoperative position. When, on the other hand, the cutout control portion 87b of the control roller 86 comes into the region of the reflex switch 88 the rays of its source of light are not sufficiently reflected to keep the said circuit closed. In consequence thereof the hoeing tools 23 resume their operative position.

Figures 14, 15:
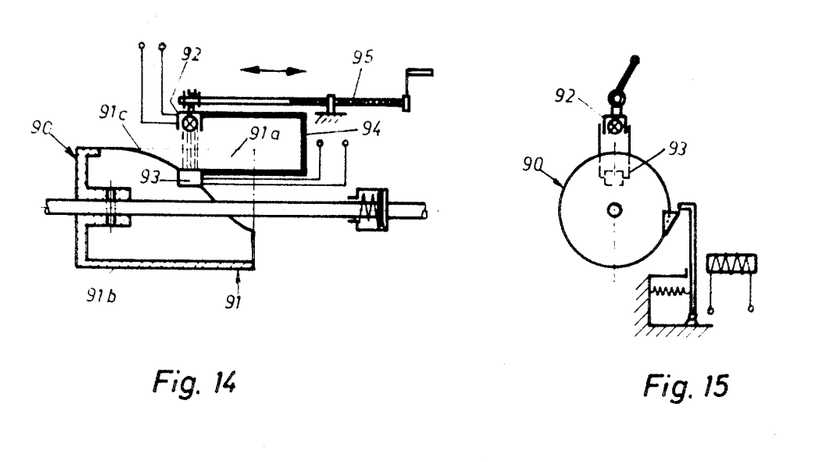
FIG. 14 shows, partly in side view and partly in section, another control roller as well as a source of light and a photoelectric cell cooperating therewith.
FIG. 15 shows an end view of the control roller and switching means of FIG. 14.

The embodiment shown in FIGS. 14 and 15 comprises a control roller 90 being provided with a hollow cylindrical shell 91. This hollow cylindrical shell 91 has a cutout part 91a representing a first control portion corresponding to the protected zones and a remaining part 91b forming a second control portion corresponding to the minimum working stretches, wherein the two control portions 91a and 91b are limited with regard to each other by the curved edge 91c of the part 91b. The switching means of this embodiment includes a source of light 92 arranged at the outside and a photoelectric cell 93 arranged at the inside of the shell 91 of the control roller 90. The source of light 92 and the photoelectric cell 93 are supported by a common bracket 94 being attached to a spindle 95 by means of which the source of light 92 and the photoelectric cell 93 are axially adjustable with regard to the control roller 90. If in this embodiment the control portion 91a of the control roller 90 is in the region of the source of light 92 and photoelectric cell 93 the rays of the source of light 92 can reach the photoelectric cell 93. This causes the closing of a circuit which results in a deactivation of the hoeing tools 23 by means of the rotary magnet 25. If, on the other hand, the control portion 91b of the control roller 90 comes into the region of the source of light 92 and photoelectric cell 93 the rays of the source of light 92 are prevented by this control portion 91b to reach the photoelectric cell 93. In consequence thereof the said circuit is opened and the hoeing tools 23 resume their operative position.

Figure 16:
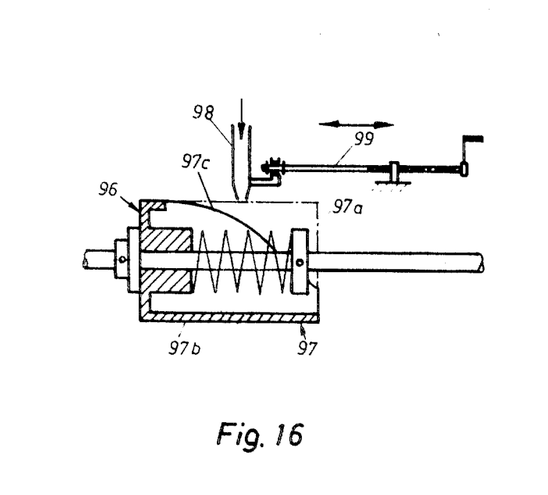
FIG. 16 shows, partly in side view and partly in section, a further control roller and pneumatic switching means cooperating therewith.
Figure 17:
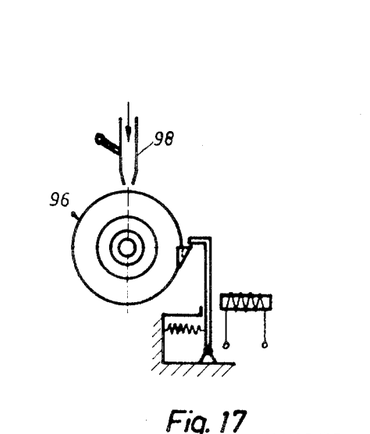
FIG. 17 shows an end view of the control roller and switching means of FIG. 16.

The embodiment of FIGS. 16 and 17 comprises a control roller 96 having a hollow cylindrical shell 97. This hollow cylindrical shell 97 has a cutout part 97a representing a first control portion corresponding to the protected zones and a remaining part 97b forming a second control portion corresponding to the minimum working stretches, wherein the two control portions 97a and 97b are limited with regard to each other by the curved edge 97c of the part 97b. This embodiment includes pneumatic switching means having a nozzle 98 terminating closely adjacent the shell 97 of the control roller 96. The nozzle 98 is attached to a spindle 99 by means of which it is axially adjustable with regard to the control roller 96. When the control portion 97a of the control roller 96 is adjacent the nozzle 98 air can flow rather freely through the nozzle 98. This causes the closing of an electric circuit which results in a deactivation of the hoeing tools 23 by means of the rotary magnet 25. When, on the other hand, the control portion 97b of the control roller 96 comes into the region of the nozzle 98 the air can no longer flow as freely as before through the nozzle 98 and the air pressure in the nozzle 98 increases. This increase of the air pressure in the nozzle 98 has the consequence that the said circuit opens and the hoeing tools 23 resume their operative position.

What we claim is:

1. In a row-type agricultural machine having working implements selectively operable for working on discrete portions of a working stretch of a row of plants and having selectively operable electrical means connected therewith for selectively deactivating the implements to create a protected nonworked zone, the improvement comprising a control means including a source of electrical energy, a rotary cylindrical control roller formed with an external cylindrical surface including first and second circumferential control portions overlapping in the axial direction and corresponding to the protected nonworked stretch and the working stretch, drive means for drivingly rotating said control roller, switch support means mounted adjacent the periphery of said control roller means for adjusting the axial position of said switch support means with respect to said control roller, switch means mounted on said switch support means adjacent the control roller, electrical circuit means connecting said source of electrical energy to said switch means and to said selectively operable electrical means with said switch means being closed when adjacent said first circumferential control portion for activating said selectively operable electrical means to deactivate said working implements but being open when adjacent said second circumferential control portion for permitting activation of said working implements.

2. The invention of claim 1 wherein the ratio of the peripheral extents of the control portions of said control rollers as peripherally measured along circumferential arcs lying in a common plane spaced a given distance from the end of said control roller varies in accordance with the axial distance of said plane from the end of the control roller.

3. The invention of claim 2 additionally including plant detecting means, a selectively actuable stop means mounted adjacent said control roller for engaging and stopping said control roller and holding said control roller in an angular position in which said switch means is opened to permit activation of said working implements, and stop deactivating means connected to said plant detecting means for deactivating said stop means in response to the detection of a plant to release the rotary control roller to consequently subsequently deactivate said working implements upon rotation of the control roller into a position in which said first circumferential control portion is adjacent said switch.

4. The invention of claim 3 additionally including a stop surface on the periphery of said control roller, wherein said stop means comprises a pivoted lever member pivotally mounted adjacent the periphery of said roller and having a free end portion, spring means biassing said free end portion of said pivoted lever member into holding engagement with said stop surface to hold said control roller against rotation, wherein said deactivating means for said stop device comprises an electromagnet mounted adjacent said stop lever member for withdrawing said stop lever member from holding engagement with its associated stop surface upon actuation of said electromagnet.

5. The invention of claim 1 wherein said drive means for drivingly rotating said control roller includes a friction coupling capable of slippage upon resistance of said control roller to rotation.

6. The invention of claim 5 wherein said drive means for drivingly rotating said control roller additionally includes a pneumatic tire at substantially atmospheric pressure on its interior and drive means connecting said tire to said friction coupling for driving said friction coupling and said control roller.

7. The invention of claim 4 wherein said plant-detecting means includes an electric feeler member positioned a selected distance in advance of the working implements along the direction of travel of the apparatus, electrical conduit means connecting said feeler to said electromagnet for energizing the electromagnet upon contact of the feeler member with a plant.

8. Apparatus according to claim 1, wherein the first circumferential control portion is formed of an electrically conductive surface and the second circumferential control portion is formed of an electrically nonconductive surface, the switching means including a sliding contact engaging with the circumference of the control roller so as to sequentially engage said control portions.

9. Apparatus according to claim 8, wherein each control roller consists of dielectric material and is covered with a metal layer in the region of the first circumferential control portion.

10. Apparatus according to claim 1, wherein the first circumferential control portion is formed of an electrically conductive surface and the second circumferential control portion is formed of an electrically nonconductive surface the switching means being formed by an electromagnetic induction coil arranged closely adjacent the circumference of the control roller.

11. Apparatus according to claim 1, wherein the first circumferential control portion is formed of an electrically conductive surface and the second circumferential control portion is formed of an electrically nonconductive surface, the switching means consisting of a terminal switch arranged closely adjacent the circumference of the control roller and comprising a reed contact.

12. Apparatus according to claim 1, wherein the circumferential surface of the control roller is a relief surface having a depression in the area of the first control portion and an elevation in the area of the second control portion, the switching means being formed of a microcontact which has an actuating lever engaging with the circumferential surface of the control roller.

13. Apparatus according to claim 1, wherein the control roller comprises a hollow cylindrical shell having a cutout part representing the first circumferential control portion, while its remaining part forms the second circumferential control portion, the switching means including a reflex switch arranged closely adjacent the circumference of the control roller.

14. Apparatus according to claim 1, wherein the control roller comprises a hollow cylindrical shell having a cutout part representing the first circumferential control portion, while its remaining part forms the second circumferential control portion, the switching means including a source of light arranged at the outside and a photoelectric cell arranged at the inside of the shell of the control roller.

15. Apparatus according to claim 1, wherein the control roller comprises a hollow cylindrical shell having a cutout part representing the first circumferential control portion, while its remaining part forms the second circumferential control portion, the switching means including pneumatic switching means having a nozzle terminating closely adjacent the circumference of the control roller.